United States Patent
Maes (10) Patent No.: US 9,467,858 B2
(45) Date of Patent: Oct. 11, 2016

(54) ON DEVICE POLICY ENFORCEMENT TO SECURE OPEN PLATFORM VIA NETWORK AND OPEN NETWORK

(75) Inventor: Stephane H. Maes, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 15 days.

(21) Appl. No.: 13/022,377

(22) Filed: Feb. 7, 2011

(65) Prior Publication Data

US 2011/0197257 A1    Aug. 11, 2011

Related U.S. Application Data

(60) Provisional application No. 61/302,017, filed on Feb. 5, 2010.

(51) Int. Cl.
*H04W 12/08* (2009.01)

(52) U.S. Cl.
CPC .................................. *H04W 12/08* (2013.01)

(58) Field of Classification Search
None
See application file for complete search history.

(56) References Cited

U.S. PATENT DOCUMENTS

| | | | |
|---|---|---|---|
| 6,035,025 A | 3/2000 | Hanson | |
| 6,044,403 A | 3/2000 | Gerszberg et al. | |
| 6,105,137 A | 8/2000 | Graunke et al. | |
| 6,463,470 B1 | 10/2002 | Mohaban et al. | |
| 6,493,437 B1 | 12/2002 | Olshansky | |
| 6,603,844 B1 | 8/2003 | Chavez et al. | |
| 6,842,628 B1 | 1/2005 | Arnold et al. | |
| 7,043,553 B2 | 5/2006 | Monsen et al. | |
| 7,137,003 B2 | 11/2006 | Krishnan et al. | |
| 7,185,364 B2 | 2/2007 | Knouse et al. | |
| 7,194,503 B2 | 3/2007 | Shell et al. | |
| 7,293,177 B2 * | 11/2007 | Lahti et al. | 713/188 |
| 7,346,545 B2 | 3/2008 | Jones | |
| 7,403,763 B2 | 7/2008 | Maes | |
| 7,487,493 B1 | 2/2009 | Faulkner | |
| 7,562,216 B2 | 7/2009 | Borthakur et al. | |
| 7,657,746 B2 | 2/2010 | Paramasivam et al. | |
| 7,676,550 B1 | 3/2010 | Jachner | |
| 7,809,898 B1 | 10/2010 | Kiselev et al. | |
| 7,869,788 B2 | 1/2011 | Maes | |
| 7,881,732 B2 | 2/2011 | Newville | |
| 8,065,712 B1 | 11/2011 | Cheng et al. | |

(Continued)

OTHER PUBLICATIONS

U.S. Appl. No. 12/166,535, filed Jul. 2, 2008, Office Action dated Jun. 23, 2011, 5 pages.

(Continued)

*Primary Examiner* — Kaveh Abrishamkar
(74) *Attorney, Agent, or Firm* — Kilpatrick Townsend & Stockton LLP (57) ABSTRACT

Embodiments of the invention provide methods and systems for using policy enforcement for securing open devices and networks. The method includes accessing, by a policy enforcer, a plurality of policies configured to enforce network integrity and monitoring programs and/or services running on a device. The method further includes based on at least one of the plurality of policies, comparing the programs and/or services running on the device against the programs and/or services allowed by the at least one of the plurality of policies, and based on the comparison, determining that the device is running at least one program and/or service disallowed by the at least one policy. Further, the method includes in response, prohibiting access of the device to the network.

17 Claims, 6 Drawing Sheets

(56) References Cited

U.S. PATENT DOCUMENTS

| | | | |
|---|---|---|---|
| 8,099,325 B2 | 1/2012 | Gangadharpalli et al. | |
| 8,112,483 B1 | 2/2012 | Emigh et al. | |
| 8,117,438 B1 | 2/2012 | Albisu et al. | |
| 8,234,167 B2 | 7/2012 | Civanlar et al. | |
| 8,335,720 B2 | 12/2012 | Juang et al. | |
| 8,387,108 B1 | 2/2013 | Satish et al. | |
| 8,479,265 B2 | 7/2013 | Maes | |
| 2002/0116336 A1 | 8/2002 | Diacakis | |
| 2002/0176579 A1 | 11/2002 | Deshpande et al. | |
| 2002/0178381 A1 | 11/2002 | Lee et al. | |
| 2003/0027549 A1 | 2/2003 | Kiel et al. | |
| 2003/0135746 A1 | 7/2003 | Abbott et al. | |
| 2003/0158914 A1 | 8/2003 | Satomi et al. | |
| 2003/0208754 A1 | 11/2003 | Sridhar et al. | |
| 2003/0233322 A1 | 12/2003 | Uchida et al. | |
| 2004/0002878 A1 | 1/2004 | Maria Hinton | |
| 2004/0044623 A1 | 3/2004 | Wake et al. | |
| 2004/0054923 A1 | 3/2004 | Seago et al. | |
| 2004/0059939 A1 | 3/2004 | de Jong | |
| 2004/0098715 A1 | 5/2004 | Aghera et al. | |
| 2004/0133909 A1 | 7/2004 | Ma | |
| 2004/0198374 A1 | 10/2004 | Bajikar | |
| 2004/0209595 A1 | 10/2004 | Bekanich | |
| 2004/0209614 A1 | 10/2004 | Bright et al. | |
| 2004/0260778 A1 | 12/2004 | Banister et al. | |
| 2005/0014485 A1 | 1/2005 | Kokkonen et al. | |
| 2005/0053241 A1 | 3/2005 | Fan et al. | |
| 2005/0068167 A1 | 3/2005 | Boyer et al. | |
| 2005/0091346 A1 | 4/2005 | Krishnaswami et al. | |
| 2005/0108688 A1 | 5/2005 | Lucovsky et al. | |
| 2005/0135240 A1 | 6/2005 | Ozugur | |
| 2005/0138430 A1 | 6/2005 | Landsman | |
| 2005/0154933 A1 | 7/2005 | Hsu et al. | |
| 2005/0187940 A1 | 8/2005 | Lora et al. | |
| 2005/0210499 A1 | 9/2005 | Shima | |
| 2005/0262198 A1 | 11/2005 | Leppanen | |
| 2006/0040642 A1 | 2/2006 | Boris et al. | |
| 2006/0184640 A1 | 8/2006 | Hatch | |
| 2006/0212545 A1 | 9/2006 | Nichols et al. | |
| 2006/0217107 A1 | 9/2006 | Maes | |
| 2006/0242688 A1 | 10/2006 | Paramasivam et al. | |
| 2006/0288099 A1 | 12/2006 | Jefferson et al. | |
| 2007/0024453 A1 | 2/2007 | Mohammed et al. | |
| 2007/0067297 A1 | 3/2007 | Kublickis | |
| 2007/0143827 A1* | 6/2007 | Nicodemus et al. | 726/2 |
| 2007/0143829 A1 | 6/2007 | Hinton et al. | |
| 2007/0162343 A1 | 7/2007 | Landesmann | |
| 2007/0168510 A1 | 7/2007 | Ladd et al. | |
| 2007/0191023 A1 | 8/2007 | Walter | |
| 2007/0204017 A1 | 8/2007 | Maes | |
| 2007/0244750 A1 | 10/2007 | Grannan et al. | |
| 2007/0245414 A1 | 10/2007 | Chan et al. | |
| 2008/0010301 A1 | 1/2008 | Tian et al. | |
| 2008/0060000 A1 | 3/2008 | Drouet et al. | |
| 2008/0086531 A1 | 4/2008 | Chavda et al. | |
| 2008/0126779 A1 | 5/2008 | Smith | |
| 2008/0133645 A1 | 6/2008 | Fridman | |
| 2008/0134259 A1 | 6/2008 | He | |
| 2008/0140529 A1 | 6/2008 | Agarwal | |
| 2008/0201179 A1 | 8/2008 | Maes | |
| 2008/0201188 A1 | 8/2008 | Heyman et al. | |
| 2008/0205628 A1 | 8/2008 | Mandalia et al. | |
| 2008/0208953 A1 | 8/2008 | Tian | |
| 2008/0221985 A1 | 9/2008 | Civanlar et al. | |
| 2008/0240384 A1 | 10/2008 | Suryanarayana | |
| 2008/0301189 A1 | 12/2008 | Petit et al. | |
| 2009/0037594 A1* | 2/2009 | Sever et al. | 709/230 |
| 2009/0047972 A1 | 2/2009 | Neeraj | |
| 2009/0049309 A1 | 2/2009 | Brinker et al. | |
| 2009/0187919 A1 | 7/2009 | Maes | |
| 2009/0193117 A1 | 7/2009 | Oh | |
| 2009/0255000 A1 | 10/2009 | Winterbottom et al. | |
| 2009/0292595 A1 | 11/2009 | Tonnison et al. | |
| 2009/0300704 A1 | 12/2009 | Boberg et al. | |
| 2010/0005511 A1 | 1/2010 | Maes | |
| 2010/0043077 A1 | 2/2010 | Robert | |
| 2010/0064341 A1 | 3/2010 | Aldera | |
| 2010/0075673 A1 | 3/2010 | Colbert et al. | |
| 2010/0077484 A1 | 3/2010 | Paretti et al. | |
| 2010/0088371 A1 | 4/2010 | Xu et al. | |
| 2010/0099387 A1 | 4/2010 | So et al. | |
| 2010/0100445 A1 | 4/2010 | Flood et al. | |
| 2010/0154036 A1 | 6/2010 | McColgan et al. | |
| 2010/0162126 A1 | 6/2010 | Donaldson et al. | |
| 2010/0162149 A1 | 6/2010 | Sheleheda et al. | |
| 2010/0257358 A1 | 10/2010 | Grajek et al. | |
| 2010/0268767 A1 | 10/2010 | McColgan et al. | |
| 2010/0299152 A1* | 11/2010 | Batchu et al. | 705/1.1 |
| 2010/0312621 A1 | 12/2010 | Abdulhayoglu | |
| 2010/0325427 A1 | 12/2010 | Ekberg et al. | |
| 2011/0010543 A1 | 1/2011 | Schmidt et al. | |
| 2011/0038483 A1 | 2/2011 | Goeller et al. | |
| 2011/0166943 A1 | 7/2011 | Maes | |
| 2011/0167153 A1 | 7/2011 | Maes | |
| 2011/0167479 A1 | 7/2011 | Maes | |
| 2011/0173251 A1 | 7/2011 | Sandhu et al. | |
| 2011/0182283 A1 | 7/2011 | Van Buren et al. | |
| 2011/0196728 A1 | 8/2011 | Maes | |
| 2011/0197260 A1 | 8/2011 | Maes | |
| 2012/0030771 A1* | 2/2012 | Pierson et al. | 726/26 |
| 2012/0102334 A1* | 4/2012 | O'Loughlin et al. | 713/189 |
| 2012/0117255 A1 | 5/2012 | Oh et al. | |
| 2012/0278869 A1 | 11/2012 | Guccione et al. | |
| 2012/0284100 A1 | 11/2012 | Goldberg | |
| 2012/0320888 A1 | 12/2012 | Annamalai et al. | |
| 2013/0304913 A1 | 11/2013 | Boyer et al. | |

OTHER PUBLICATIONS

U.S. Appl. No. 12/166,535, filed Jul. 2, 2008, Office Action dated Sep. 14, 2011, 15 pages.

U.S. Appl. No. 12/166,535, filed Jul. 2, 2008, Final Office Action dated Feb. 1, 2012, 13 pages.

U.S. Appl. No. 12/986,432, filed Jan. 7, 2011, Final Office Action dated Jul. 31, 2012, 18 pages.

U.S. Appl. No. 12/986,432, filed Jan. 7, 2011, Advisory Action dated Oct. 19, 2012, 2 pages.

U.S. Appl. No. 12/166,535, filed Jul. 2, 2008, Non-final Office Action mailed Nov. 21, 2012, 15 pages.

U.S. Appl. No. 13/022,367, filed Feb. 7, 2011, Non-final Office Action mailed Dec. 17, 2012, 24 pages.

U.S. Appl. No. 12/166,535, filed Jul. 2, 2008, Notice of Allowance dated Mar. 5, 2013, 21 pages.

U.S. Appl. No. 12/986,435, filed Jan. 7, 2011, Non Final Office Action dated Feb. 5, 2013, 29 pages.

U.S. Appl. No. 12/986,435, filed Jan. 7, 2011, Final Office Action dated Mar. 22, 2013, 15 pages.

U.S. Appl. No. 12/986,577, filed Jan. 7, 2011, Non-final Office Action dated Jan. 17, 2013, 29 pages.

U.S. Appl. No. 13/022,373, filed Feb. 7, 2011, Non-final Office Action mailed Mar. 7, 2013, 79 pages.

U.S. Appl. No. 12/166,535, filed Jul. 2, 2008, Advisory Action dated Apr. 9, 2012, 3 pages.

U.S. Appl. No. 12/986,432, filed Jan. 7, 2011, Office Action dated Apr. 11, 2012, 15 pages.

U.S. Appl. No. 13/022,367, filed Feb. 7, 2011, Final Office Action mailed Nov. 13, 2013, 28 pages.

U.S. Appl. No. 13/022,373, filed Feb. 7, 2011, Final Office Action mailed Oct. 7, 2013, 30 pages.

U.S. Appl. No. 12/986,577, filed Jan. 7, 2011, Non-Final Office Action dated Oct. 17, 2013, 24 pages.

U.S. Appl. No. 12/986,432, filed Jan. 7, 2011, Restriction Requirement dated Mar. 23, 2012, 6 pages.

U.S. Appl. No. 13/022,373, filed Feb. 7, 2011, Advisory Action mailed Dec. 27, 2013, 3 pages.

U.S. Appl. No. 12/986,577, Final Office Action mailed on Mar. 13, 2014, 19 pages.

U.S. Appl. No. 12/986,435, Non-Final Office Action mailed on Apr. 23, 2014, 21 pages.

(56) References Cited

OTHER PUBLICATIONS

Gasmelseid, T. M., "From Operational Dashboards to E-Business:Multiagent Formulation of Electronic Contracts", International Journal E-Business vol. 3, Issue 3, 2007, 21 pages.
U.S. Appl. No. 12/986,435, filed Jan. 7, 2011, Advisory Action dated May 29, 2013, 3 pages.
U.S. Appl. No. 13/022,367, filed Feb. 7, 2011, Terminal Disclaimer—Disapproved mailed Mar. 13, 2013, 1 page.
U.S. Appl. No. 12/986,577, filed Jan. 7, 2011, Final Office Action dated May 7, 2013, 17 pages.
U.S. Appl. No. 13/022,367, Non-Final Office Action mailed on May 15, 2014, 13 pages.
U.S. Appl. No. 12/986,432, Non-Final Office Action mailed on Jul. 7, 2014, 16 pages.
U.S. Appl. No. 12/986,435, Final Office Action mailed on Aug. 6, 2014, 10 pages.
U.S. Appl. No. 12/986,435, Final Office Action mailed on Mar. 16, 2015, 11 pages.
U.S. Appl. No. 12/986,577, Final Office Action mailed on Mar. 23, 2015, 17 pages.
U.S. Appl. No. 13/022,367, Non-Final Office Action mailed on Apr. 9, 2015, 12 pages.
U.S. Appl. No. 12/986,432, Final Office Action mailed on Oct. 29, 2014, 20 pages.
U.S. Appl. No. 12/986,435, Non-Final Office Action mailed on Dec. 4, 2014, 10 pages.
U.S. Appl. No. 12/986,577, Advisory Action mailed on Jul. 19, 2013, 3 pages.
U.S. Appl. No. 12/986,577, Non Final Office Action mailed on Oct. 31, 2014, 18 pages.
U.S. Appl. No. 13/022,367, Final Office Action mailed on Dec. 3, 2014, 21 pages.
U.S. Appl. No. 12/986,432, Advisory Action mailed on Jan. 12, 2015, 2 pages.
U.S. Appl. No. 12/986,577, Advisory Action mailed on May 29, 2015, 3 pages.
U.S. Appl. No. 12/986,577, Non-Final Office Action mailed on Jul. 10, 2015, 28 pages.
U.S. Appl. No. 13/022,373, Final Office Action mailed on Jun. 1, 2015, 23 pages.
U.S. Appl. No. 12/986,432, Non-Final Office Action mailed on Sep. 8, 2015, 22 pages.
U.S. Appl. No. 12/986,435, Non-Final Office Action mailed on Aug. 7, 2015, 10 pages.
U.S. Appl. No. 12/986,577, Final Office Action mailed on Oct. 26, 2015, 13 pages.
U.S. Appl. No. 13/022,367, Notice of Allowance mailed on Sep. 29, 2015, 7 pages.
U.S. Appl. No. 13/022,373, Final Office Action mailed on Oct. 8, 2015, 16 pages.
U.S. Appl. No. 12/986,435, Final Office Action mailed on Nov. 18, 2015, 16 pages.
U.S. Appl. No. 12/986,432, Final Office Action mailed on Jan. 13, 2016, 30 pages.
U.S. Appl. No. 12/986,435, Advisory Action mailed on Feb. 2, 2016, 2 pages.
U.S. Appl. No. 13/022,373, Advisory Action mailed on Dec. 23, 2015, 3 pages.
U.S. Appl. No. 12/986,435, filed Jan. 7, 2011, Non-Final Office Action dated Mar. 24, 2016, all pages.
U.S. Appl. No. 13/022,373, filed Feb. 7, 2011, Non-Final Office Action dated May 2, 2016, all pages.
U.S. Appl. No. 12/986,577, filed Jan. 7, 2011, Non-Final Office Action dated Mar. 30, 2016, all pages.

* cited by examiner

ON DEVICE POLICY ENFORCEMENT TO SECURE OPEN PLATFORM VIA NETWORK AND OPEN NETWORK

PRIORITY CLAIM

This application claims priority to U.S. Provisional Application Ser. No. 61/302,017, entitled ON DEVICE POLICY ENFORCEMENT TO SECURE OPEN PLATFORM VIA NETWORK AND OPEN NETWORK, filed on Feb. 5, 2010, which is incorporated by reference in its entirety for any and all purposes.

RELATED APPLICATIONS

This applications relates to U.S. Pat. No. 7,426,381, entitled DEVICE BILLING AGENT, filed on Mar. 23, 2005, U.S. Pat. No. 7,403,763, entitled DEVICE AGENT, filed on Sep. 19, 2005, U.S. patent application Ser. No. 12/173,797, entitled DEVICE BILLING AGENT, filed on Jul. 15, 2008, and U.S. Patent Application No. (Not Yet Assigned), entitled SYSTEM SELF INTEGRITY AND HEALTH VALIDATION FOR POLICY ENFORCEMENT, filed concurrently wherewith, which are all incorporated by reference in their entirety for any and all purposes.

BACKGROUND OF THE INVENTION

Embodiments of the present invention relate generally to methods and systems for policy enforcement and, more particularly, to on device policy enforcement to secure open platform via open networks.

Typically, it is difficult to control programs and/or services running on a device on both open and closed networks. In order to control the programs and/or services running on devices, network service providers have imposed closed devices and/or networks. In other words, in order to connect to the provider's network, the user must utilize a closed (or propriety) device (e.g., Apple™ iPhone, Qualcomm™ Brew, etc.) which affords the provider strict control over the programs and services able to be run on the devices.

Alternatively, network providers have implemented closed networks (e.g., Blackberry™, Apple™, IMS, etc.) which impose strict control on which devices are able log on and access the network. However, more recently both devices and networks have become more and more open, thus decreasing the control the network providers have over their networks. Accordingly, there are many ways to run programs and services on a network which are prohibited by the network providers, and thus, there is a need for improvements in the art.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods for enforcing policy-based advertisements are described. For example, a service request (e.g., a webpage request, a short message service (SMS) text request, a voice telephone call request, a video request, etc.) may be intercepted by a policy enforcement mechanism. This policy enforcement mechanism may intercept the service request and check if usage policies have been satisfied (e.g., authentication, authorization, subscription, etc.). The policy enforcement mechanism may further check if an advertisement should be presented to the user, and if so, what type of advertisement over what type of medium.

Accordingly, the policy enforcement mechanism may then dynamically present an advertisement(s) adapted to the medium channel and the user. Furthermore, the advertisement may allow the user to receive the desired service at a reduced fee or rate. Accordingly, once the advertisement has been accepted and/or received by the user, the service is then presented to the user. Various additional details of embodiments of the present invention will be described below with reference to the figures.

Figure 1:
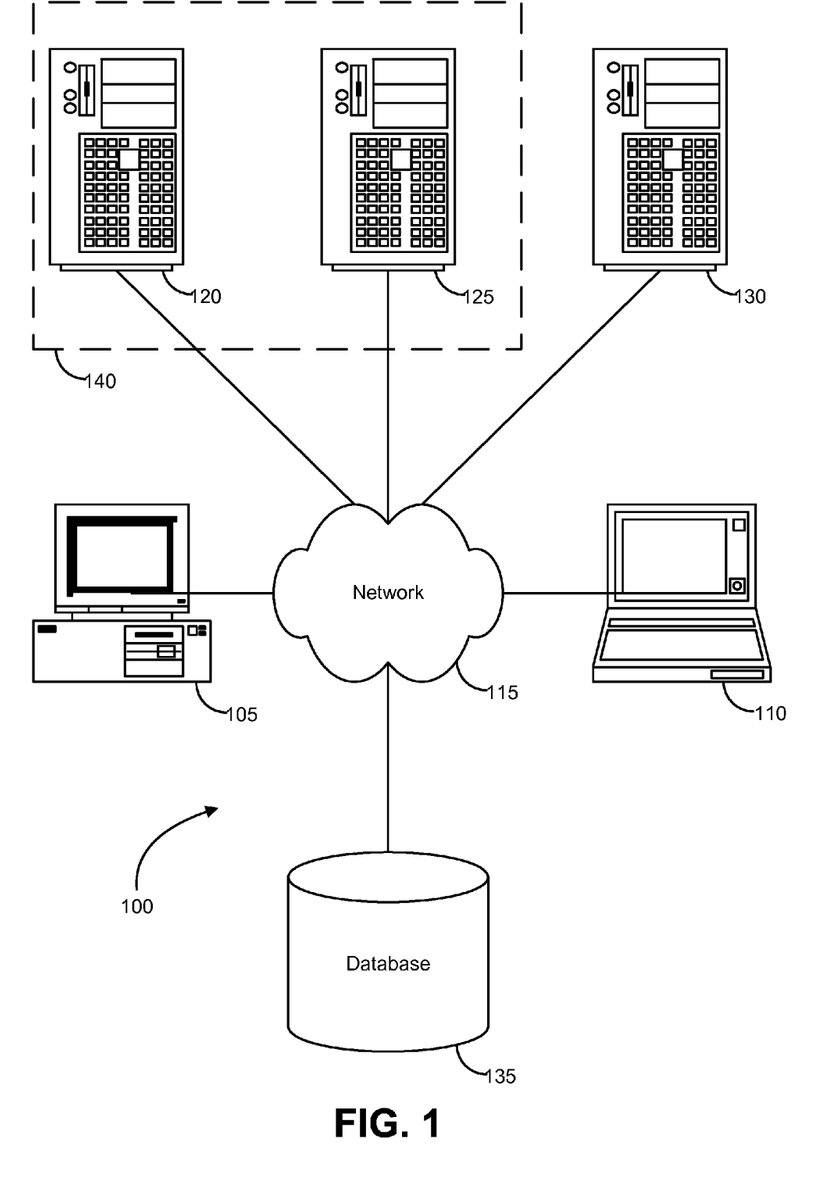
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, a dedicated application, a web browser, etc. The user computers 105, 110 can be general purpose personal computers (including, merely by way of example, personal computers and/or laptop computers running various versions of Microsoft® Corp.'s Windows® and/or Apple Corp.'s Macintosh® operating systems) and/or workstation computers running any of a variety of commercially available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network 115 can be any type of network familiar to those skilled in the art that can support data communications using any of a variety of commercially available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network ("WAN"); a virtual network, including without limitation, a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system 100 may also include one or more server computers 120, 125, 130 which can be general purpose computers and/or specialized server computers (including, merely by way of example, PC servers, UNIX servers, mid-range servers, mainframe computers rack-mounted servers, etc.), personal digital assistants (PDAs), and other such computing devices. One or more of the servers (e.g., 130) may be dedicated to running applications, such as a business application, a web server, an application server, etc. Such servers may be used to process requests from user computers 105, 110. The applications can also include any number of applications for controlling access to resources of the servers 120, 125, 130.

The web server 140 can be running an operating system including any of those discussed above, as well as any commercially available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation, those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from user computers 105, 110 and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle® 10g, that is adapted to store, update, and retrieve data in response to SQL-formatted commands.

Figure 2:
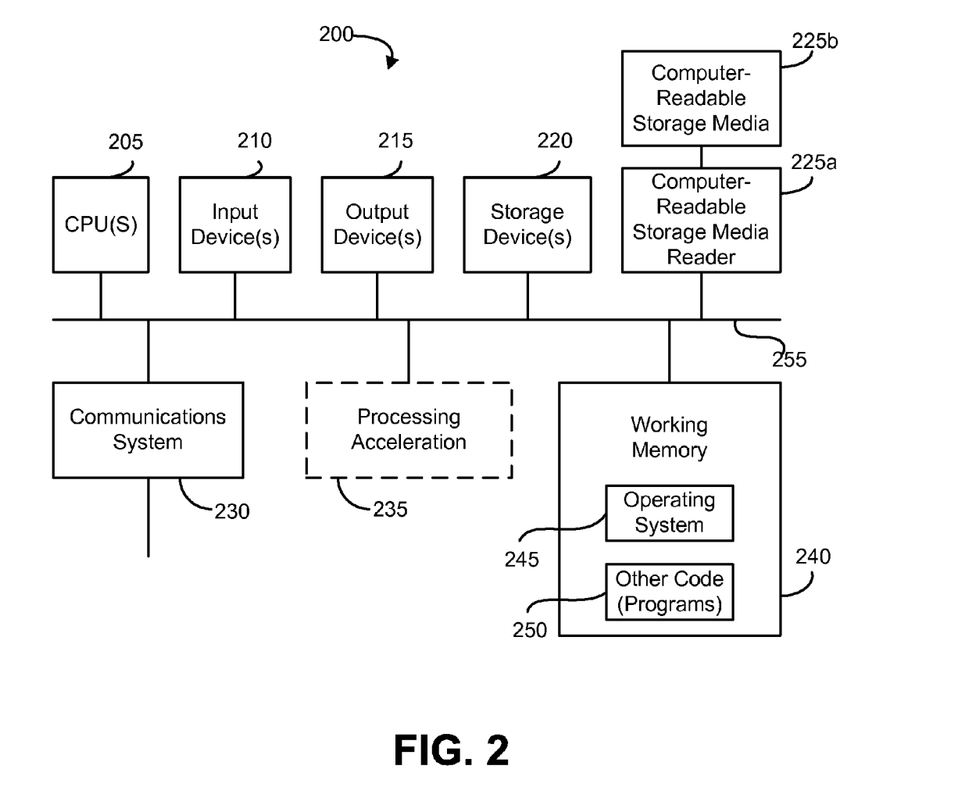
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage devices 220. By way of example, storage devices 220 may be disk drives, optical storage devices, and/or solid-state storage devices such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 (FIG. 1) and/or any other computer described above with respect to the system 200.

The computer system 200 may also be comprised of software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
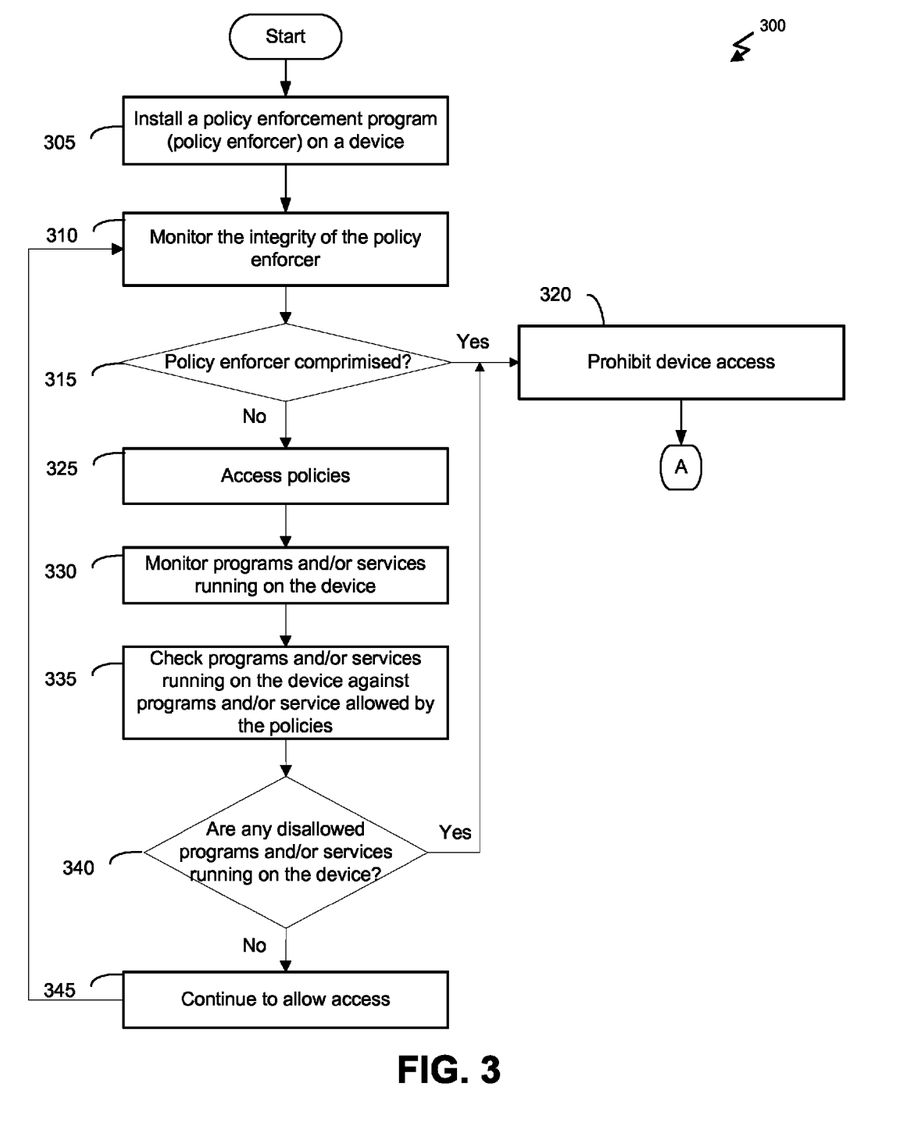
FIG. 3 is a flow diagram illustrating a method for using policy enforcement for securing open devices and networks, according to one embodiment of the present invention.

Turning next to FIG. 3, a method 300 is illustrated for using policy enforcement for securing open devices and networks, according to one embodiment of the present invention. At process block 305, a policy enforcement program (i.e., policy enforcer) may be installed on a device. In one embodiment, the device may be a mobile device, a cellular device, a personal digital assistant (PDA), a personal computer, or the like. Alternatively, the policy enforcer may be installed on a computer system external to the device.

Furthermore, the integrity of the policy enforcer may be monitored (process block 310). In other words, the policy enforcer may "self" monitor its health and integrity in order to determine whether the policy enforcer has been compromised (decision block 315). For example, the policy enforcer may examine itself to determine whether its coding, associated policy files and other files have been modified, etc. by checking a file digital signature, such as SHA, CHECKSUM, or PGP variations or other document integrity checks. If at any time the policy enforcer determines that it has been compromised, the policy enforcer can instruct the device's service provider to prohibit access to the device (process block 320). In one embodiment, the service provider may be a cellular service provider, an Internet service provider (ISP), a digital media provider, etc. Further, the policy enforcer may check its integrity at set intervals (e.g., every 10 seconds, every hour, every day, etc.), or the policy enforcer may check itself at random intervals.

If it is determined that the policy enforcer has not been compromised, then at process block 325, a policy database is accessed and policies are retrieved. In one embodiment, such policies instruct the policy enforcer as to the appropriate action to take with regard to certain situations. For example, a device may be inappropriately implementing a file server (or other content server), may be gaining access to services which have not been purchased under an account agreement, the device may be compromising the network integrity, among other things may utilize policies and the policy enforcer to ensure network security and integrity.

As such, at process block 330, the policy enforcer will monitor the programs and/or services running on the device. Furthermore, the policy enforcer may check the programs determined to be running on the device against the programs and/or service allowed to run on the device according to the policy requirements. Alternatively or in addition, a check of program integrity may be performed (i.e., whether files or settings have not been corrupted/modified). Similarly, a check of the settings of the devices against device presets may be performed (i.e., determining what is allowed to be changed and what should not have been changed). These integrity checks may also cover, for example, the O/S, the firmware, the drivers, hardware/peripheral, etc. In a further embodiment, the device may be running a Linux (or other operating system) file, email, FTP, HTTP, etc. server, which may be restricted based on the policies.

Accordingly, at decision block 340, a determination is made whether any disallowed programs and/or services are running on the device. This may also include checking the device hardware/software settings and peripherals to determine if they are not incorrectly modified and that the applications have not been corrupted. If no disallowed programs and/or services are found on the device, then at process block 345, the device is continued to be allowed access to the network provided by the service provider. However, if it is determined that disallowed programs and/or services are running on the device (i.e., per the policy), then at process block 320, the device is denied access to the network from the service provider, at least until the breach can be remedied. In one embodiment, the implementation may be on an open network with an unknown network service provider (i.e., the Internet). As such, instead of blocking access on the Internet, embodiments could be used to block access to specific services, like updates, access to certain web sites, etc. Furthermore, prevention of downloads of new content from certain sites, etc. This may be achieved by having these services checking with the policy enforcer prior to providing access to the service for the device.

According to a further embodiment, results from the policy enforcer's analysis of the device performance may be reported to the service provider. In one embodiment, the report may be transmitted to the service provider at the time it is discovered (in real time), or in a batch. Furthermore, as opposed to issuing a complete denial of service, the policy enforcer may only deny service related to the breached software and/or device resources.

Turning now to an alternative embodiment, which provides for application and application modules to include an electronic signature in any messages sent to each other (always or sometimes) and to a server (or service provider). The signed messages are configured to ensure the presence of the enforcement modules. In one embodiment, multiple key modules may be applied on a data exchange and each application or application module can sign each of their contributions and the sequences of keys may then be used as proof of correct processing.

Furthermore, modules may have their own condition to check. Such a condition check may include a platform/presence of other known malicious programs and/or services, the absence of encryption/protection removal (e.g., by testing themselves to determine if virtually protected data is read protected or is unprotected), or the condition check may prompt the user to take some actions. In addition, testing of chip/circuit/diagnostic to determine if additional chips are present on the device. If such hardware is detected, then the device may be denied service, or the like.

A such, access control to open networks using open devices may be correctly/easily/practically implemented. Furthermore, prohibited programs, services, operation, etc. can be detectable and reported, resulting in denial of service as appropriate; removing or preventing the rogue program running can be detected and reported. Additionally, aspects of the present invention add extra layers to confuse the rogue software and that can be detected and reported, further resulting in denial of service. The addition of software that is incompatible with software running on the device can be detected and reported, which may result in a denial of service, as appropriate. Furthermore, aspects of the present invention can detect and determine the use of an alternative O/S in order to circumvent certain protection, report the use of such an O/S and deny service.

Figure 4:
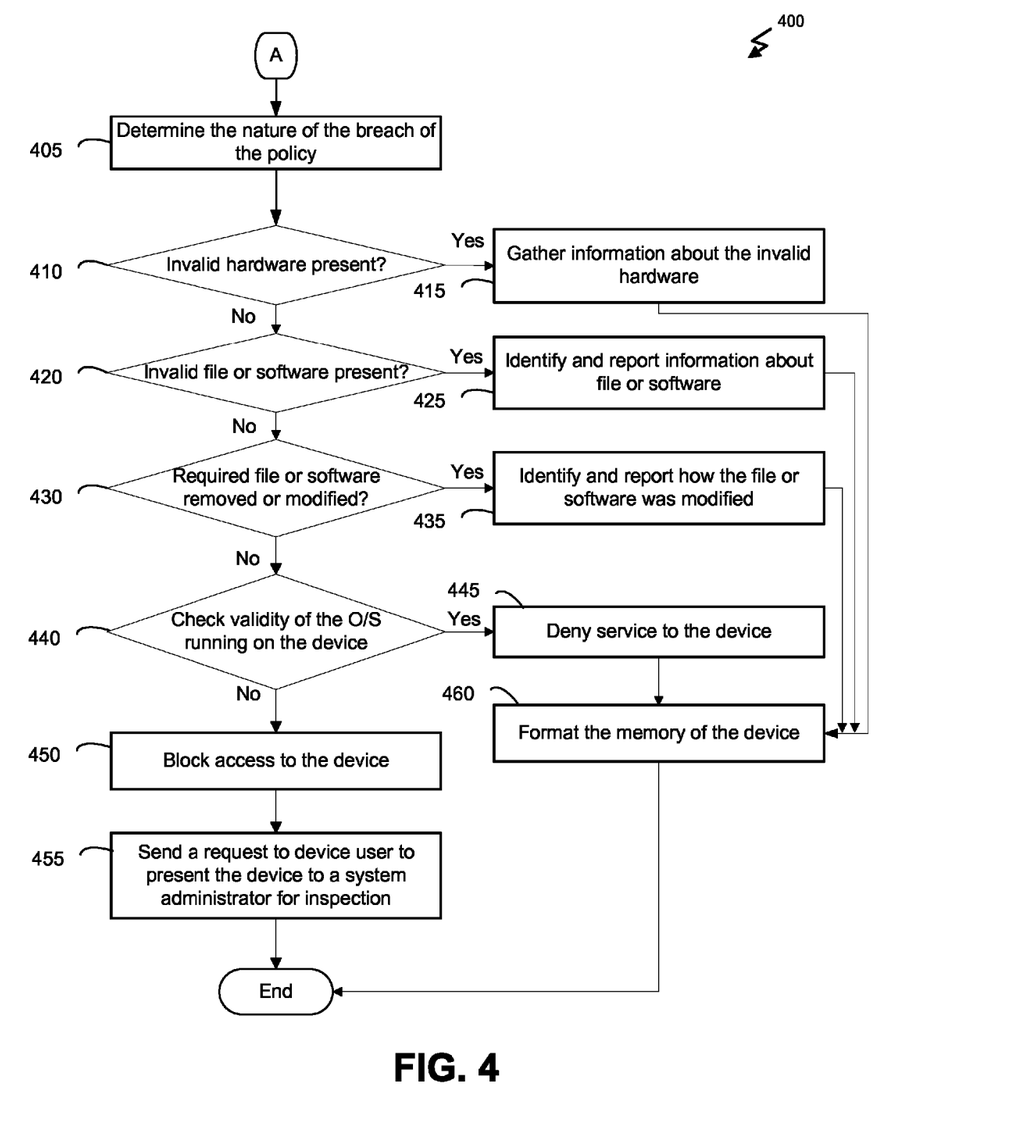
FIG. 4 is a flow diagram further illustrating a method for using policy enforcement for securing open devices and networks, according to one embodiment of the present invention.

Turning now to FIG. 4, which illustrates a method 400 of using policy enforcement for securing open devices and networks, according to a further embodiment of the present invention. Continuing form point A in FIG. 3, at process block 405, the nature of the breach of the policy is determined. Particularly, a determination is made whether invalid additional and/or modified hardware is present on the device (decision block 410). If modified or invalid additional hardware is found on the device, then information about the hardware may be gathered and reported (process block 415). Otherwise, a determination is made whether an invalid file or software application is present on the device (decision block 420).

If an invalid file or software application is found on the device, then at process block 425, the file or software application is identified and information about the file or software application is reported. Alternatively, if there are no invalid files or software applications found on the device, then a determination is made whether required files or software have been removed or modified on the device (decision block 430). If it is determined that required files or software have been removed of modified, then at process block 435, the removed/modified software/file is identified and reported. Specifically, if the file of software was modified, then exactly how the software or file was modified may also be reported.

If no required software or files have been modified, then, at decision block 440, a check of the validity of the O/S running on the device is performed. Certain O/S systems may be used to circumvent certain protections, and as such, if the device is running such an O/S, the device may be compromised. For example, the Linux O/S may be used to implement a web, file, mail, etc. server, which is prohibited by the network service provider. Accordingly, if an invalid O/S is being used by the device, at process block 445, service may be denied to the device.

If the O/S is valid, then at process block 450, access to service for the device is blocked. Then, at process block 455, a request may be sent to the device user instructing the user to present the device to a system administrator for inspection and/or repair.

Furthermore, continuing to process block 460, based on the information gathered about the various intrusions into the device, a strategy to repair the device may be implemented. In one embodiment, the memory of the device may be formatted and the device's operating system may be reformatted.

Figure 5:
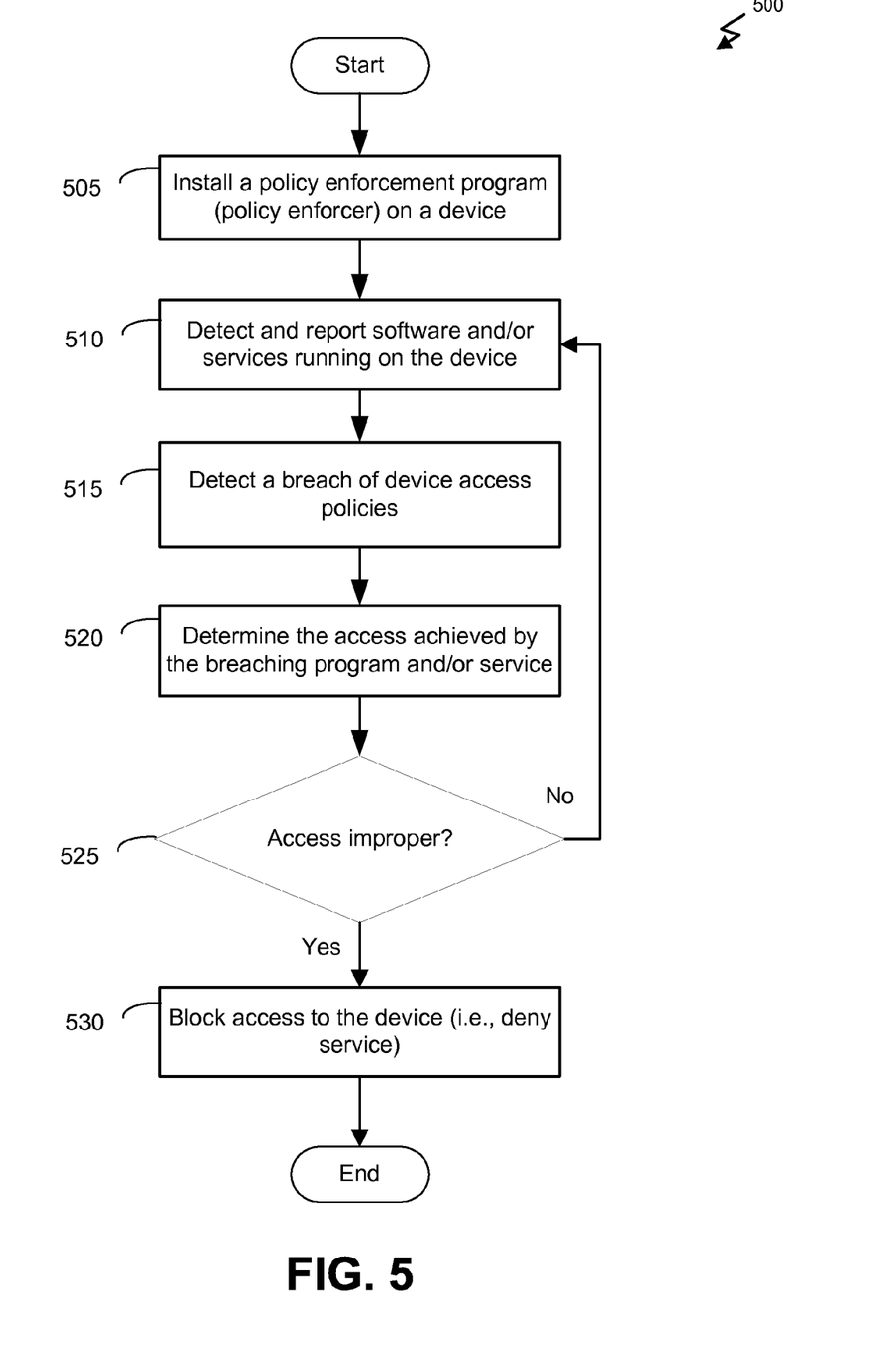
FIG. 5 is a flow diagram illustrating a method for using policy enforcement for securing open devices and networks, according to an alternative embodiment of the present invention.

Referring next to FIG. 5, a method 500 is illustrated for using policy enforcement for securing open devices and networks, according to an alternative embodiment of the present invention. At process block 505, a policy enforcer program (or chip) is installed on a device. At process block 510, the policy enforcer detects and reports the software running on the device.

Furthermore, at process block 515, the policy enforcer detects and reports any breach in the device's access policy. For example, if the device is running software and/or services which are prohibited by the network provider, then such activity is detected and reported to the network service provider.

Then, the policy enforcer determines the access achieved by the breaching software and/or service running on the device (process block 520). For example, disallowed software which provides unauthorized access to a device, disallowed O/S, disallowed services, etc. As such, at decision block 525, a determination is made whether the access obtained by the device is proper according to the enforced policies. If no breach is detected, then the policy enforcer continues to detect and report the activities of the device (process block 510). Conversely, if the protections have been breached, then at process blocked 530, access to the device is block and service is denied until corrective action can be taken.

Figure 6A:
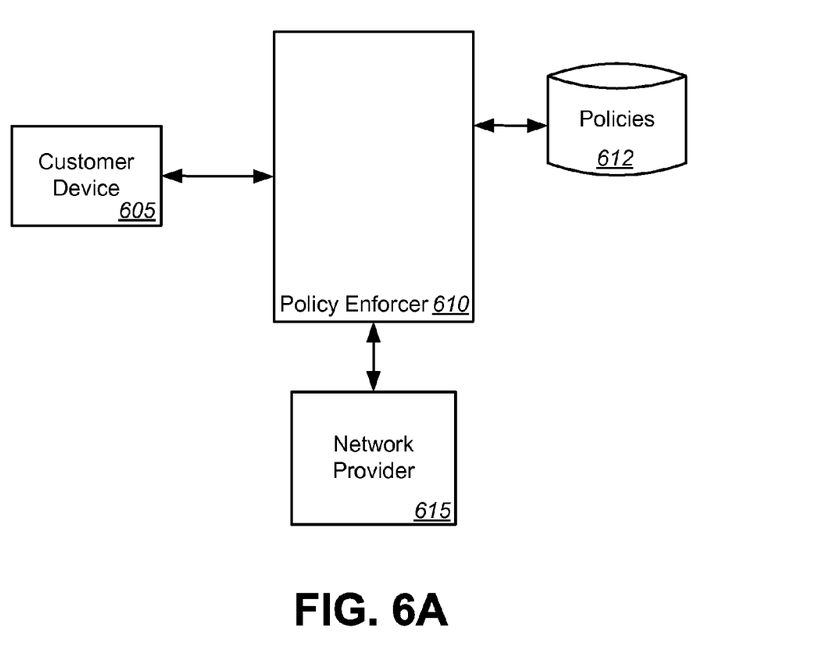
FIGS. 6A and 6B are block diagrams illustrating systems for using policy enforcement for securing open devices and networks, according to embodiments of the present invention.

Turning to FIG. 6A, a system is shown for using policy enforcement for securing open devices and networks, according to one embodiment of the present invention. The system includes a customer device 605 in connection with a policy enforcer 610. Further, policy enforcer 610 is coupled with a policy database 612 and a network provider 615. In one embodiment, the system in FIG. 6A may be used to implement methods 300, 400, and 500 described above.

For example, customer device 605 may install an invalid O/S, unauthorized software and/or services, an invalid hardware chip, etc., and policy enforcer 610 may detect such actions by customer device 605, and based on the policies stored in policy database 612, policy enforcer 610 may then report such activities by customer device 605 to service provider 615. Accordingly, policy enforcer 610 may then deny service to customer device 605 based on the activities of customer device 605.

Figure 6B:
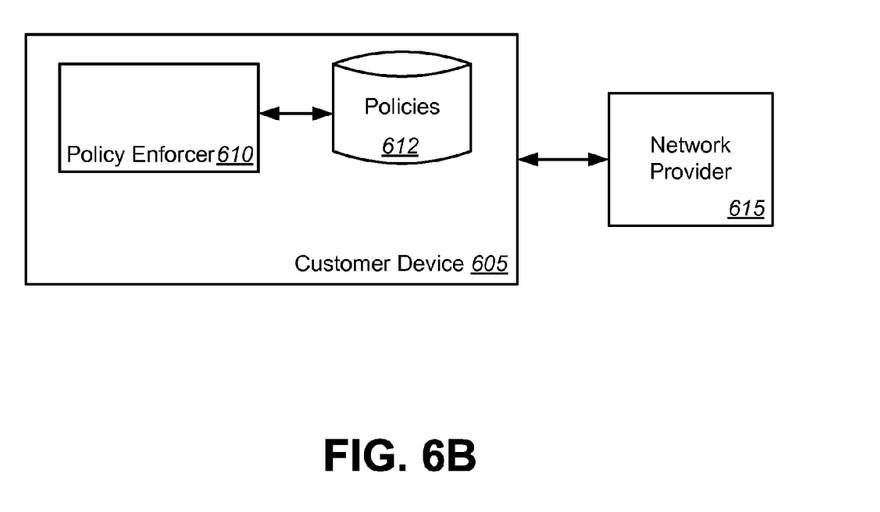

FIG. 6B illustrates a system for using policy enforcement for securing open devices and networks, according to an alternative embodiment of the present invention. Similar to the system in FIG. 6A, the system in FIG. 6B may be used to implement methods 300, 400, and 500. However, instead of policy enforcer 610 and policy database 612 being located remotely from customer device 605, policy enforcer 610 and policy database 612 are locally located on customer device 605.

In the foregoing description, for the purposes of illustration, methods were described in a particular order. It should be appreciated that, in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits, programmed with the instructions to perform the methods. These machine-executable instructions may be stored on one or more machine-readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of using policy enforcement for securing open devices and networks, the method comprising:
    monitoring, by a policy enforcer executing on a mobile device, an integrity of the policy enforcer;
    determining, by the policy enforcer executing on the mobile device, if the policy enforcer has been compromised;
    in response to determining that the policy enforcer has not been compromised, allowing, by the policy enforcer executing on the mobile device, the mobile device to access a network;
    accessing, by the policy enforcer executing on the mobile device, a policy database storing a plurality of policies configured to enforce network integrity on the network providing a plurality of services, the plurality of services including at least a cellular communication service, and an Internet service;
    retrieving, by the policy enforcer executing on the mobile device, the plurality of policies from the policy database;
    monitoring, at random intervals by the policy enforcer executing on the mobile device, programs, services, O/S, firmware, drivers, hardware, and peripherals running on the mobile device;
    based on at least one of the plurality of policies, comparing, by the policy enforcer executing on the mobile device, the programs, the services, the O/S, the firmware, the drivers, the hardware, and the peripherals running on the mobile device against programs, services, O/S, firmware, drivers, hardware, and peripherals allowed by the at least one of the plurality of policies; and
    based on the comparison and in response to determining, by the policy enforcer executing on the mobile device, that the mobile device is running one or more programs, services, O/S, firmware, drivers, hardware, and peripherals not allowed by the at least one of the plurality of policies, prohibiting, by the policy enforcer executing on the mobile device, access of the mobile device to one or more services of the plurality of services provided by the network based on the at least one of the plurality of policies; and
    implementing a mitigation process while continuing to allow the mobile device to access the network and one or more other services of the plurality of services provided by the network based on the at least one of the plurality of policies.

2. The method of claim 1, wherein the mobile device periodically syncs with a server or with a server from which the plurality of policies are obtained.

3. The method of claim 1, further comprising:
    determining, by the policy enforcer executing on the mobile device, that the policy enforcer has been compromised; and
    in response, prohibiting, by the policy enforcer executing on the mobile device, the mobile device from accessing to the network.

4. The method of claim 1, wherein the policy enforcer is compromised based in part on one or more of the following situations: hardware associated with the policy enforcer has been modified, software of the policy enforcer has been modified and/or deleted, files associated with the policy enforcer have been modified and/or deleted, and software and/or hardware has been added to the mobile device to circumvent operation of the policy enforcer.

5. The method of claim 1, wherein the mitigation process comprises:
    gathering, by the policy enforcer executing on the mobile device, information about the one or more programs, services, O/S, firmware, drivers, hardware, and peripherals not allowed by the at least one of the plurality of policies;
    implementing, by the policy enforcer executing on the mobile device, a corrective strategy; and
    propagating, by the policy enforcer executing on the mobile device, the corrective strategy to the network.

6. The method of claim 1, wherein the mitigation process further comprises:
    determining, by the policy enforcer executing on the mobile device, if invalid files and/or software are present on the mobile device; and
    in response to invalid files and/or software being present, identifying, by the policy enforcer executing on the mobile device, and reporting information about the invalid files and/or software and formatting a memory of the mobile device.

7. The method of claim 1, wherein the mitigation process further comprises:
    determining, by the policy enforcer executing on the mobile device, if required files and/or software has been removed or modified within the mobile device; and
    in response to required files and/or software being removed or modified, identifying and reporting, by the policy enforcer executing on the mobile device, which required files and/or software have been removed and/or how the required files and/or software have been modified and formatting a memory of the mobile device.

8. The method of claim 1, wherein the mitigation process comprises:
    checking, by the policy enforcer executing on the mobile device, a validity of a operating system (O/S) present on the mobile device; and
    in response to the O/S present on the mobile device being invalid, denying, by the policy enforcer executing on the mobile device, the mobile device access to the network and formatting a memory of the mobile device.

9. The method of claim 1, wherein prohibiting access of the mobile device to one or more services of the network comprises blocking access to the Internet service.

10. The method of claim 1, wherein prohibiting access of the mobile device to one or more services of the network comprises blocking access to the cellular communication service.

11. A system for policy enforcement for securing open devices and networks, the system comprising:
a network providing a plurality of services, the plurality of services including at least a cellular communication service, and an Internet service;
a mobile device communicatively coupled with the network and configured to execute programs and access files;
a policy enforcer executing on the mobile device, the policy enforcer configured to:
monitor an integrity of the policy enforcer;
determine if the policy enforcer has been compromised;
in response to determining that the policy enforcer has not been compromised, allow the mobile device to access the network;
access a policy database storing a plurality of policies configured to enforce network integrity;
retrieve the plurality of policies from the policy database;
monitor at random intervals programs, services, O/S, firmware, drivers, hardware, and peripherals running on the mobile device;
based on at least one of the plurality of policies, compare the programs, services, O/S, firmware, drivers, hardware, and peripherals running on the mobile device against programs, services, O/S, firmware, drivers, hardware, and peripherals allowed by the at least one of the plurality of policies;
based on the comparison and in response to determining that the mobile device is running one or more programs, services, O/S, firmware, drivers, hardware, and peripherals not allowed by the at least one of the plurality of policies, prohibiting, by the policy enforcer executing on the mobile device, access of the mobile device to one or more services of the plurality of services provided by the network based on the at least one of the plurality of policies; and
implementing a mitigation process while continuing to allow the mobile device to access to the network and one or more other services of the plurality of services provided by the network based on the at least one of the plurality of policies; and
a network provider in connection with the policy enforcer, the network provider configured to receive from the policy enforcer a request to deny access to the one or more services of the network, and implement denial of access to the one or more services of the network to the mobile device.

12. The system of claim 11, further comprising the mobile device including the policy enforcer.

13. The system of claim 11, wherein the mobile device is a closed device.

14. The system of claim 11, wherein the mobile device is an open device.

15. The system of claim 11, wherein the network is an open network.

16. The system of claim 11, wherein the network is a closed network.

17. A non-transitory machine-readable medium including sets of instructions stored thereon for using policy enforcement for securing open devices and networks which, when executed by a machine, causes the machine to:
monitor, by a policy enforcer executing on a mobile device, an integrity of the policy enforcer;
determine, by the policy enforcer executing on the mobile device, if the policy enforcer has been compromised;
in response to determining that the policy enforcer has not been compromised, allow, by the policy enforcer executing on the mobile device, the mobile device to access a network;
access, by the policy enforcer executing on the mobile device, a policy database storing a plurality of policies configured to enforce network integrity on the network providing a plurality of services, the plurality of services including at least a cellular communication service, and an Internet service;
retrieve, by the policy enforcer executing on the mobile device, the plurality of policies from the policy database;
monitor, at random intervals by the policy enforcer executing on the mobile device, programs, services, O/S, firmware, drivers, hardware, and peripherals running on the mobile device;
based on at least one of the plurality of policies, compare, by the policy enforcer executing on the mobile device, the programs, the services, the O/S, the firmware, the drivers, the hardware, and the peripherals running on the mobile device against programs, services, O/S, firmware, drivers, hardware, and peripherals allowed by the at least one of the plurality of policies;
based on the comparison and in response to determining, by the policy enforcer executing on the mobile device, that the mobile device is running one or more programs, services, O/S, firmware, drivers, hardware, and peripherals not allowed by the at least one of the plurality of policies prohibiting, by the policy enforcer executing on the mobile device, access of the mobile device to one or more services of the plurality of services provided by the network based on the at least one of the plurality of policies; and
implementing a mitigation process while continuing to allow the mobile device to access to the network and one or more other services of the plurality of services provided by the network based on the at least one of the plurality of policies.

* * * * *

UNITED STATES PATENT AND TRADEMARK OFFICE
CERTIFICATE OF CORRECTION

| | | |
|---|---|---|
| PATENT NO. | : 9,467,858 B2 | Page 1 of 1 |
| APPLICATION NO. | : 13/022377 | |
| DATED | : October 11, 2016 | |
| INVENTOR(S) | : Maes | |

It is certified that error appears in the above-identified patent and that said Letters Patent is hereby corrected as shown below:

In the Drawings

On sheet 3 of 6, in FIG. 3, under Reference Numeral 315, Line 1, delete "comprimised?" and insert -- compromised? --, therefor.

In the Specification

In Column 7, Line 41, delete "form" and insert -- from --, therefor.

Signed and Sealed this
Sixth Day of June, 2017

Michelle K. Lee
*Director of the United States Patent and Trademark Office*